United States Patent
Alquwayfili et al.

(10) Patent No.: US 10,078,877 B2
(45) Date of Patent: Sep. 18, 2018

(54) METHOD AND SYSTEM FOR EFFICIENTLY EMBEDDING A WATERMARK IN A DIGITAL IMAGE FOR MOBILE APPLICATIONS

(71) Applicant: King Abdulaziz City for Science and Technology, Riyadh (SA)

(72) Inventors: Norah Alquwayfili, Riyadh (SA); Amr Alasaad, Riyadh (SA)

(73) Assignee: THE KING ABDULAZIZ CITY FOR SCIENCE AND TECHNOLOGY (KACST), Riyadh (SA)

(*) Notice: Subject to any disclaimer, the term of this patent is extended or adjusted under 35 U.S.C. 154(b) by 381 days.

(21) Appl. No.: 14/949,622

(22) Filed: Nov. 23, 2015

(65) Prior Publication Data

US 2017/0148127 A1 May 25, 2017

(51) Int. Cl.
*G06K 9/00* (2006.01)
*G06T 1/00* (2006.01)

(52) U.S. Cl.
CPC .... *G06T 1/0028* (2013.01); *G06T 2201/0061* (2013.01)

(58) Field of Classification Search
None
See application file for complete search history.

(56) References Cited

U.S. PATENT DOCUMENTS

2004/0022444 A1* 2/2004 Rhoads ............... G06K 9/00577
382/232
2006/0239503 A1* 10/2006 Petrovic .................. H04L 9/002
382/100
2011/0182466 A1* 7/2011 Lin ......................... G06T 1/005
382/100
2014/0348379 A1* 11/2014 Kraegeloh ........... G06K 9/6215
382/103

OTHER PUBLICATIONS

Fridrich, Jiri. "Robust bit extraction from images." Multimedia Computing and Systems, 1999. IEEE International Conference on. vol. 2. IEEE, 1999.*
Langelaar, Gerhard C., Iwan Setyawan, and Reginald L. Lagendijk. "Watermarking digital image and video data. A state-of-the-art overview." IEEE Signal processing magazine 17.5 (2000): 20-46.*

* cited by examiner

*Primary Examiner* — Sean Conner
(74) *Attorney, Agent, or Firm* — Dennemeyer & Associates, LLC; Steven M. Shape (57) ABSTRACT

The invention provides a method and system for embedding a watermark in a digital image and recovering the watermark from the digital image. The method includes representing the plurality of binary bits in the watermark using a plurality of symbols, wherein each symbol of the plurality of symbols represents at least two binary bits. The plurality of symbols are then transformed into a plurality of pseudo noise (PN) sequences, wherein a symbol transformed into a PN sequence represents one or more PN sequence vectors from a set of PN sequence vectors. Once the transformation is done, the plurality of PN sequences are embedded in the digital image to generate a watermarked image. During recovery, the watermark is recovered from the watermarked image by identifying the plurality of PN sequences in the watermarked image for recovering the corresponding plurality of symbols associated with the watermark.

11 Claims, 8 Drawing Sheets

| i | Symbol Representation ($S_i$) | $pn\_sequence_i$ |
|---|---|---|
| 1 | 00 | [$A_1$, $A_2$] |
| 2 | 01 | [$A_1$, $B_2$] |
| 3 | 10 | - [$A_1$, $A_2$] |
| 4 | 11 | - [$A_1$, $B_2$] |

| i | Symbol Representation ($S_i$) | $pn\_sequence_i$ |
|---|---|---|
| 1 | 000 | $[A_1, A_2, A_3, A_4]$ |
| 2 | 001 | $[A_1, B_2, A_3, A_4]$ |
| 3 | 010 | $[A_1, B_2, C_3, A_4]$ |
| 4 | 011 | $[A_1, B_2, C_3, D_4]$ |
| 5 | 100 | $-[A_1, A_2, A_3, A_4]$ |
| 6 | 101 | $-[A_1, B_2, A_3, A_4]$ |
| 7 | 110 | $-[A_1, B_2, C_3, A_4]$ |
| 8 | 111 | $-[A_1, B_2, C_3, D_4]$ |

| i | Symbol Representation ($S_i$) | $pn\_sequence_i$ |
|---|---|---|
| 1 | 0000 | $[A_1, A_2, A_3, A_4, A_5, A_6, A_7, A_8]$ |
| 2 | 0001 | $[A_1, B_2, A_3, A_4, A_5, A_6, A_7, A_8]$ |
| 3 | 0010 | $[A_1, B_2, C_3, A_4, A_5, A_6, A_7, A_8]$ |
| 4 | 0011 | $[A_1, B_2, C_3, D_4, A_5, A_6, A_7, A_8]$ |
| 5 | 0100 | $[A_1, B_2, C_3, D_4, E_5, A_6, A_7, A_8]$ |
| 6 | 0101 | $[A_1, B_2, C_3, D_4, E_5, F_6, A_7, A_8]$ |
| 7 | 0110 | $[A_1, B_2, C_3, D_4, E_5, F_6, G_7, A_8]$ |
| 8 | 0111 | $[A_1, B_2, C_3, D_4, E_5, F_6, G_7, H_8]$ |
| 9 | 1000 | $-[A_1, A_2, A_3, A_4, A_5, A_6, A_7, A_8]$ |
| 10 | 1001 | $-[A_1, B_2, A_3, A_4, A_5, A_6, A_7, A_8]$ |
| 11 | 1010 | $-[A_1, B_2, C_3, A_4, A_5, A_6, A_7, A_8]$ |
| 12 | 1011 | $-[A_1, B_2, C_3, D_4, A_5, A_6, A_7, A_8]$ |
| 13 | 1100 | $-[A_1, B_2, C_3, D_4, E_5, A_6, A_7, A_8]$ |
| 14 | 1101 | $-[A_1, B_2, C_3, D_4, E_5, F_6, A_7, A_8]$ |
| 15 | 1110 | $-[A_1, B_2, C_3, D_4, E_5, F_6, G_7, A_8]$ |
| 16 | 1111 | $-[A_1, B_2, C_3, D_4, E_5, F_6, G_7, H_8]$ |

METHOD AND SYSTEM FOR EFFICIENTLY EMBEDDING A WATERMARK IN A DIGITAL IMAGE FOR MOBILE APPLICATIONS

FIELD OF THE INVENTION

The invention generally relates to the field of embedding a watermark in a digital image.

BACKGROUND OF THE INVENTION

Digital watermarking is an effective technology and is used widely to achieve copyright protection and integrity of multimedia data. Multimedia data, can be, but need not be limited to, still images, audio, and digital video. Digital watermarking involves embedding a message also known as a digital watermark in an original digital image to "mark" its ownership. The existence of the digital watermarks in the original digital image can then be detected when a recovery algorithm is applied to the original digital image.

In the prior art, several watermarking algorithms have been proposed for embedding watermarks in digital images and recovering the watermarks from the digital images. These watermarking algorithms can be classified into three different watermarking techniques each from different domains such as, but not limited to, Spatial Domain, Frequency Domain and Wavelet Domain. Discrete Cosine Transformation (DCT) and Discrete Wavelet Transformation (DWT) are the two widely used transformations in watermark embedding algorithms. However, these digital watermarking algorithms are computation-intensive and consume a lot of power and energy. These issues need to be addressed if watermarking algorithms need to be used to protect the copyright of images stored at mobile devices which are later uploaded by a user to social media websites. This is because mobile devices have limited computational resources and energy.

Therefore, in light of the above, there is a need for an improved method and system that implements an efficient digital watermarking technique on resource constrained computing devices.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to embedding a watermark in a digital image.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for embedding a watermark in a digital image and recovering the watermark from the digital image, wherein the watermark includes a plurality of binary bits. The method includes representing the plurality of binary bits in the watermark using a plurality of symbols, wherein each symbol of the plurality of symbols represents at least two binary bits. The plurality of symbols are then transformed into a plurality of pseudo noise (PN) sequences, wherein a symbol transformed into a PN sequence represents one or more PN sequence vectors from a set of PN sequence vectors. Once the transformation is done, the plurality of PN sequences corresponding to the plurality of symbols are embedded in the digital image to generate a watermarked image. During recovery, the watermark is recovered from the watermarked image by identifying the plurality of PN sequences in the watermarked image for recovering the corresponding plurality of symbols associated with the watermark.

Figure 1:
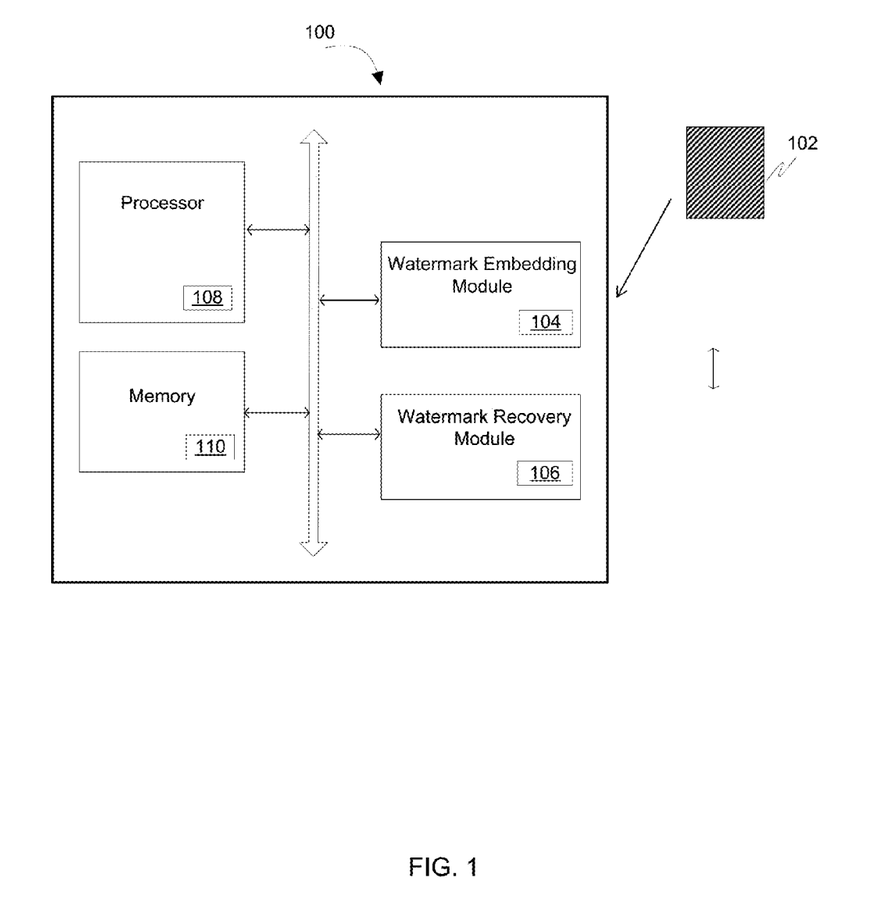
FIG. 1 illustrates a system for embedding a watermark in a digital image and recovering the watermark from the digital image in accordance with an embodiment of the invention.

FIG. 1 illustrates a system 100 for embedding a watermark 102 in a digital image and recovering watermark 102 from the digital image. Watermark 102 includes a plurality of binary bits. The digital image can be, but need not be limited to, still images, digital audio and digital video.

As illustrated, system 100 includes a watermark embedding module 104 for embedding watermark 102 in the digital image and a watermark recovery module 106 for recovering watermark 102 embedded in the digital image. Watermark embedding module 104 and watermark recovery module 106 are communicatively coupled to a processor 108 and a memory 110. Also, processor 108 and memory 110 are communicatively coupled.

In order to embed watermark 102 is the digital image, watermark embedding module 104 represents the plurality of binary bits in watermark 102 using a plurality of symbols. Each symbol of the plurality of symbols represents at least two binary bits in watermark 102. For example, a symbol can represent two binary bits, three binary bits, four binary bits and so on. Also, each symbol of the plurality of symbols uses grey coding to represent a combination of binary bits such that adjacent symbols differ in only one binary bit. The symbol representation is further described in detail in conjunction with various exemplary embodiments of the invention.

After representing the plurality of binary bits using the plurality of symbols, watermark embedding module 104 transforms the plurality of symbols into a plurality of PN sequences. The transformation includes associating each symbol with a PN sequence. Further, each PN sequence is represented by a plurality of PN sequence vectors. The plurality of PN sequence vectors are obtained from a set of PN sequence vectors. Watermark embedding module 104 maps each symbol to one or more PN sequence vectors from the set of PN sequence vectors in such a way that two or more symbols represent same PN sequence vectors.

In accordance with an embodiment of the invention, each symbol $S_i$ is mapped into a specific pn_sequence$_i$, where i={1, 2, 3, 4, . . . , number of symbols}. Each pn_sequence$_i$ is associated with a number of PN sequence vectors. Specifically, each PN sequence is represented by a plurality of N number of PN sequence vectors from a set {X1, X2, . . ., $X_N$}, $$\text{where } N = \begin{cases} \text{number of symbol} + 1, & \text{if } b = 2 \\ \text{number of symbol} - 1, & \text{if } b > 2 \end{cases}$$

where b is number of bits/symbol.

The PN sequence vectors are generated after applying a hashing function to the user password, wherein the user password is used as a seed to generate the PN sequence vectors. The generation of the PN sequence vectors is further described in detail in conjunction with FIGS. 5a, 6a and 7a.

After representing the plurality of binary bits in watermark 102 as the plurality of symbols, watermark embedding module 104 embeds the plurality of PN sequences corresponding to the plurality of symbols in the digital image to generate a watermarked image.

In an embodiment of the invention, watermark embedding module 104 divides the digital image into a plurality of image blocks prior to embedding watermark 102 in the digital image. For every symbol in watermark 102, watermark embedding module 104, then, adds a PN sequence to an image block of the plurality of image blocks instead of to the entire digital image to generate the watermarked image. Watermark embedding module 104 also adopts an adaptive procedure for selecting a size for each image block based on the required performance and quality of watermark 102.

Moving on, during recovery of watermark 102 from the watermarked image, watermark recovery module 106 executes a watermark recovery process for recovering watermark 102 in the watermarked image. Watermark recovery module 106 identifies the plurality of PN sequences embedded in the watermarked image to recover the corresponding plurality of symbols associated with watermark 102. The watermark recovery process executed by watermark recovery module 106 is as follows.

In accordance with an embodiment of the invention, watermark recovery module 106 computes a correlation value correlation$_i$ corresponding to a correlation between the watermarked image and a PN sequence pn_sequence$_i$. The correlation value correlation$_i$ includes a magnitude and a sign. The magnitude of correlation$_i$ is then compared to a threshold, where i denotes the pn_sequence identification.

Based on the comparison, watermark recovery module 106 identifies pn_sequence$_i$ embedded in the watermarked image based on the sign of correlation$_i$ to recover a corresponding symbol $S_i$ of watermark 102.

The comparison follows an iterative process for eliminating PN sequences that have a correlation magnitude less than a threshold. Further, the threshold is selected based on a size of a PN sequence, and the number of thresholds is selected based on the number of binary bits in a symbol. The iterative process is further explained in detail as follows.

In accordance with the exemplary embodiment of the invention, a correlation value correlation$_i$ corresponding to a correlation between the watermarked image and a pn_sequence$_i$ is obtained. The magnitude of correlation$_1$ is then compared against threshold$_i$. If the magnitude of correlation$_1$ is greater than threshold$_1$, it is inferred that the watermarked image is embedded with either pn_sequence$_1$ corresponding to symbol $S_1$ or a negative representation of pn_sequence$_1$. Therefore, in order to determine whether pn_sequence$_1$ or its negative representation is embedded in the watermarked image, the sign of correlation$_1$ is checked. If the sign of correlation$_1$ is positive, it is determined that pn_sequence$_1$ is embedded in the watermarked image. If the sign of correlation$_1$ is negative, it is determined that the negative representation of pn_sequence$_1$ is embedded in the watermarked image. The corresponding symbols (binary bits) in watermark 102 are then recovered based on the determination.

On the other hand, if the magnitude of correlation$_1$ is less than the threshold$_1$, the magnitude of correlation$_1$ determines initial decision region and identify potential symbols $S_i$, $S_{+1}$, $S_{i-1}$ and their negative representations. If the magnitude of correlation$_i$ is less than threshold$_i$ and greater than threshold$_{i-1}$, correlation$_i$ is calculated between the watermarked image and pn_sequence$_i$. If the magnitude of correlation$_i$ is greater than threshold$_1$, it is inferred that the watermarked image is embedded with either pn_sequence$_i$ corresponding to symbol $S_i$ or the negative representation of pn_sequence$_i$ corresponding to the negative representation symbol of S$_i$. Therefore, in order to determine whether pn_sequence$_i$ or the negative representation of pn_sequence$_i$ is embedded in the watermarked image, the sign of correlation$_i$ is checked. If the sign of correlation$_i$ is positive, it is determined that pn_sequence$_i$ is embedded in the watermarked image. If the sign of correlation$_i$ is negative, it is determined that the negative representation of pn sequence, is embedded in the watermarked image. The corresponding symbols (binary bits) in watermark 102 are then recovered based on the determination.

On the other hand, if the magnitude of correlation$_i$ is less than threshold$_1$, it is either pn_sequence$_{-1}$, pn_sequence$_{+1}$ or their negative representations is embedded in the watermarked image. For the decision making, the watermark recovery process considers Euclidean distances to the adjacent two thresholds (threshold$_i$ and threshold$_{i-1}$). If a distance between magnitude of correlation$_1$ and threshold, is less than a distance between magnitude of correlation$_1$ and threshold$_{i-1}$, it is inferred that either pn_sequence$_{+1}$ or its negative representation is embedded in the watermarked image. The sign is then checked for the determination. Else, if a distance between magnitude of correlation$_1$ and threshold, is greater than a distance between magnitude of correlation$_1$ and threshold$_{i-1}$, it is inferred that either pn_sequence$_{i-1}$ or its negative representation is embedded in the watermarked image and the sign is checked for the determination.

The thresholds are selected based on decision regions used to recover the watermark in the watermarked image. The decision regions are based on the size of pn_sequence$_i$ and the number of binary bits represented by symbol S$_i$.

In an embodiment of the invention, watermark recovery module 106 subtracts the digital image from the watermarked image prior to obtaining the correlation value. For example, before correlating the watermarked image with a pn_sequence$_i$, the original digital image is subtracted from the watermarked image as follows: corr$_2$(watermarked image—original digital image, pn_sequence$_i$)=corr$_2$($\Sigma_{i=1}^{n}$ (pn_sequence$_i$), pn_sequence$_i$), where n is the number of symbols in the watermark message. This results in guaranteed high correlation if the pn_sequence$_i$ is embedded in the digital image.

Figure 2:
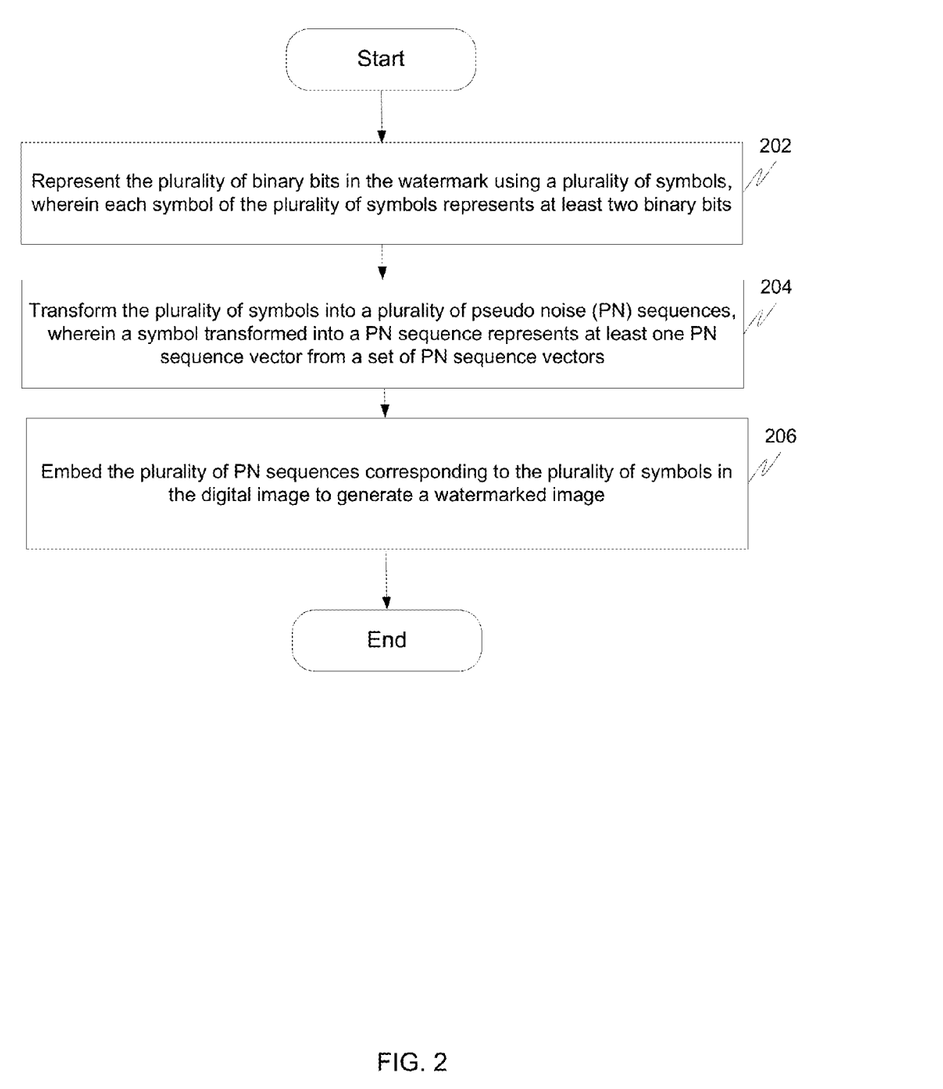
FIG. 2 illustrates a flowchart of a method for embedding a watermark in a digital image in accordance with an embodiment of the invention.

FIG. 2 illustrates a flowchart of a method for embedding watermark 102 in a digital image in accordance with an embodiment of the invention, wherein watermark 102 includes a plurality of binary bits.

At step 202, the plurality of binary bits in watermark 102 is represented using a plurality of symbols. Each symbol of the plurality of symbols represents at least two binary bits in watermark 102. For example, a symbol can represent two binary bits, three binary bits, four binary bits and so on. Also, each symbol of the plurality of symbols uses grey coding to represent a combination of bits such that adjacent symbols differ in only one bit.

After representing the plurality of binary bits using the plurality of symbols, at step 204, the plurality of symbols are then transformed into a plurality of PN sequences. The transformation includes associating each symbol with a PN sequence. Further, each PN sequence is represented by a plurality of PN sequence vectors, wherein the plurality of PN sequence vectors are obtained from a set of PN sequence vectors. Each symbol is then mapped to a number of PN sequence vectors from the set in such a way that at least two symbols represent same PN sequence vectors.

After representing the plurality of binary bits in watermark 102 as the plurality of symbols, at step 206, the plurality of PN sequences are embedded in the digital image to generate a watermarked image.

Figure 3:
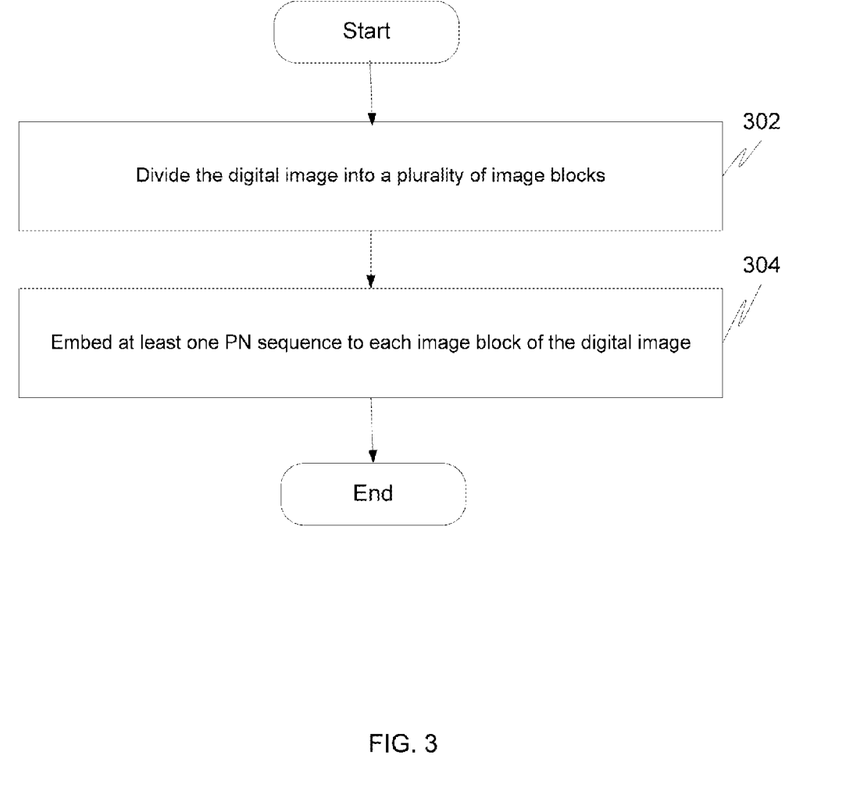
FIG. 3 illustrates a flowchart of a method for embedding a plurality of PN sequences in a plurality of image blocks in the digital image to generate a watermarked image in accordance with another embodiment of the invention.

Step 206 is further explained in detail in conjunction with FIG. 3.

FIG. 3 is illustrates a flowchart of a method for embedding the plurality of PN sequences in a plurality of image blocks in the digital image to generate the watermarked image in accordance with another embodiment of the invention.

At step 302, the digital image is divided into a plurality of image blocks prior to embedding watermark 102 in the digital image. Thereafter, at step 304, for every symbol in watermark 102, a PN sequence is added to an image block of the plurality of image blocks instead of to the entire digital image to generate the watermarked image.

Finally, during recovery, the plurality of PN sequences embedded in the watermarked image are identified to recover the corresponding plurality of symbols associated with watermark 102.

Figure 4:
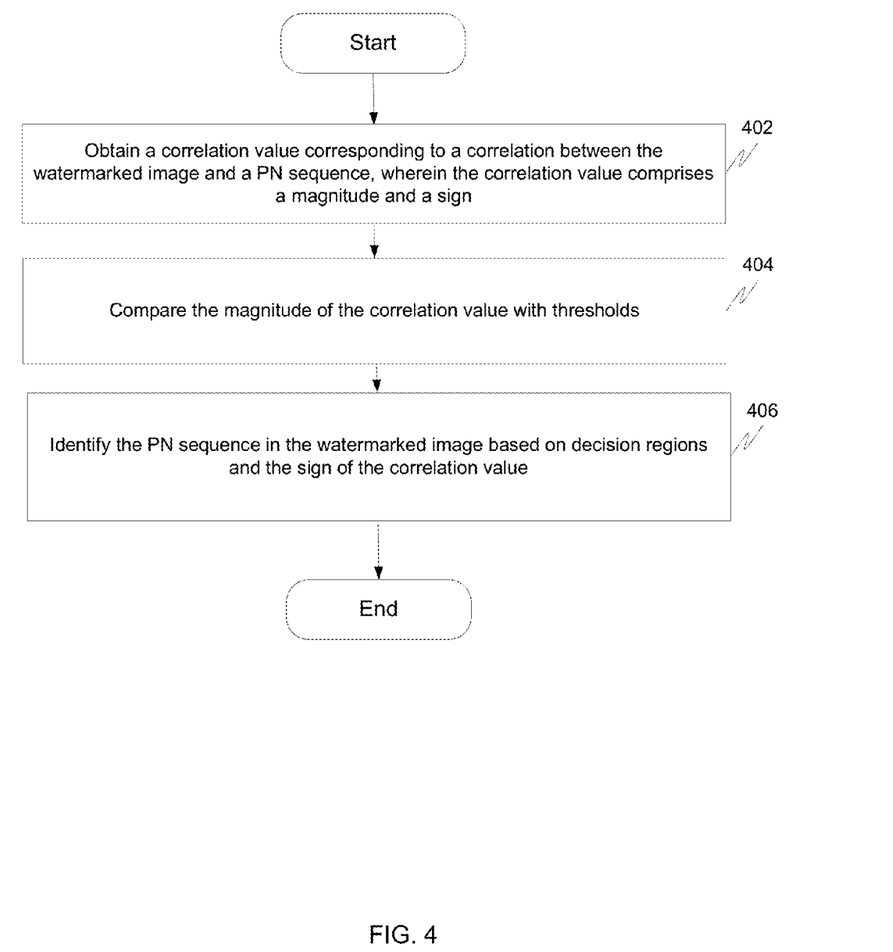
FIG. 4 illustrates a flowchart of a method for recovering a watermark embedded in a digital image in accordance with an embodiment of the invention.

FIG. 4 illustrates a flowchart of a method for recovering watermark 102 embedded in the digital image in accordance with an embodiment of the invention.

At step 402, a correlation value corresponding to a correlation between the watermarked image and a PN sequence is computed for identifying the plurality of PN sequences in the watermarked image. The correlation value includes a magnitude and a sign. Then, at step 404, the magnitude of the correlation value is compared to thresholds. A threshold is selected based on decision regions on the watermarked image. The decision regions are based on the size of a PN sequence and the number of binary bits represented by a symbol. Further, step 404 is an iterative process used for eliminating PN sequences that have a correlation magnitude less than a threshold. Finally, at step 406, the PN sequence in the watermarked image is identified based on decision regions and sign of the correlation value and the corresponding symbol is recovered.

The system and method described above are further explained detail in conjunction with various exemplary embodiments of the invention.

Figure 5A:
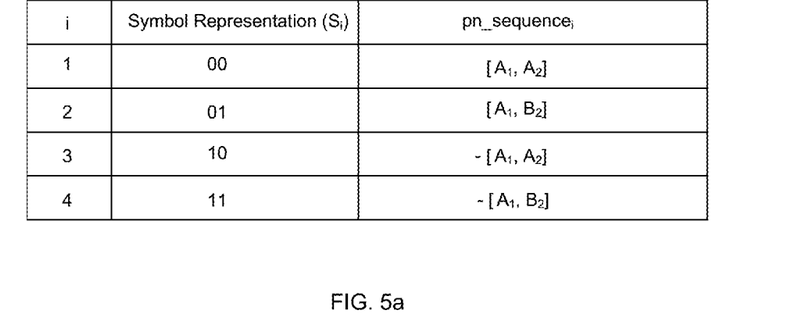
FIG. 5a illustrates a table depicting two binary bits symbol representation of a plurality of PN sequences in accordance with an exemplary embodiment of the invention.

FIG. 5*a* illustrates a table depicting two binary bits symbol representation of the plurality of PN sequences for embedding watermark 102 in the digital image in accordance with an exemplary embodiment of the invention.

As illustrated in FIG. 5*a*, every two binary bits of watermark 102 are represented by a symbol S$_i$. Symbol S$_i$ is then mapped into a specific pn_sequence$_i$, where i={1, 2, 3, 4}. Thus, there are 4 pn_sequences and 4 symbols representing combinations of two binary bits.

In accordance with the symbol representation illustrated in FIG. 5*a*, pn_sequence$_1$ is identical to pn_sequence$_2$ in the first part of vector elements A$_1$ but differs in the second part of vector elements A$_2$ and B$_2$, while pn_sequence$_1$ is identical to pn_sequence$_3$ with respect to the vector elements A$_1$ and A$_2$ but with a difference in sign and pn_sequence$_2$ is identical to pn_sequence$_4$ with respect to the vector elements A$_1$ and B$_2$ but with a difference in sign. Therefore, pn_sequence$_1$=−pn_sequence$_3$ and pn_sequence$_2$=−pn_sequence$_4$.

The watermark recovery process in the case of the two binary bits symbol representation is as follows.

In accordance with the exemplary embodiment of the invention, in a first iteration, a correlation value correlation$_i$ corresponding to a correlation between the watermarked image and a pn_sequence$_1$ is obtained. The magnitude of correlation$_1$ is then compared against a threshold$_1$. If the magnitude of correlation$_1$ is greater than threshold$_1$, it is inferred that the watermarked image is embedded with either $pn\_sequence_1$ corresponding to symbol $S_1$ or a negative representation of $pn\_sequence_1$, that is $pn\_sequence_3$ corresponding to symbol $S_3$. Therefore, in order to determine whether $pn\_sequence_1$ or $pn\_sequence_3$ is embedded in the watermarked image, the sign of $correlation_1$ is checked. If the sign of $correlation_1$ is positive, it is determined that $pn\_sequence_1$ is embedded in the watermarked image. If the sign of $correlation_1$ is negative, it is determined that $pn\_sequence_3$ is embedded in the watermarked image. The corresponding symbols (binary bits) in watermark 102 are then recovered based on the determination.

On the other hand, if the magnitude of $correlation_1$ is less than $threshold_1$, it is inferred that the watermarked image is embedded with either $pn\_sequence_2$ corresponding to symbol $S_2$ or $pn\_sequence_4$ corresponding to symbol $S_4$. Therefore, in order to determine whether $pn\_sequence_2$ or $pn\_sequence_4$ is embedded in the watermarked image, the sign of $correlation_2$ is checked. If the sign of $correlation_2$ is positive, it is determined that $pn\_sequence_2$ is embedded in the watermarked image. If the sign of $correlation_2$ is negative, it is determined that $pn\_sequence_4$ is embedded in the watermarked image. Thereafter, the corresponding symbols in watermark 102 are recovered based on the determination.

Figure 5B:
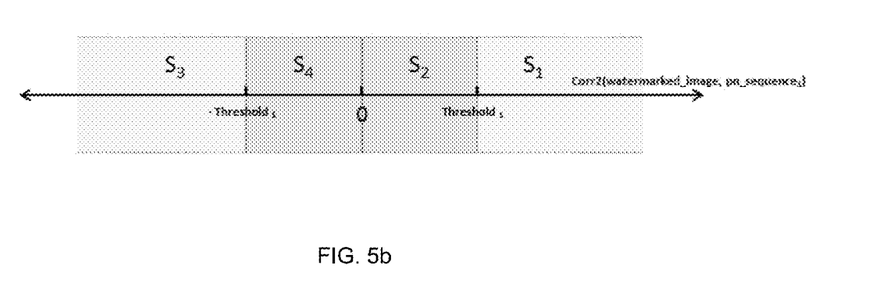
FIG. 5b depicts decision regions and thresholds in a watermark recovery process for the two binary bits symbol representation in accordance with an exemplary embodiment of the invention.

The thresholds are selected based on decision regions on the watermarked image. The decision regions are based on the size of pn sequence, and the number of binary bits represented by symbol $S_i$. The decision regions in the case of the two binary bits symbol representation is illustrated in FIG. 5b.

Figure 6A:
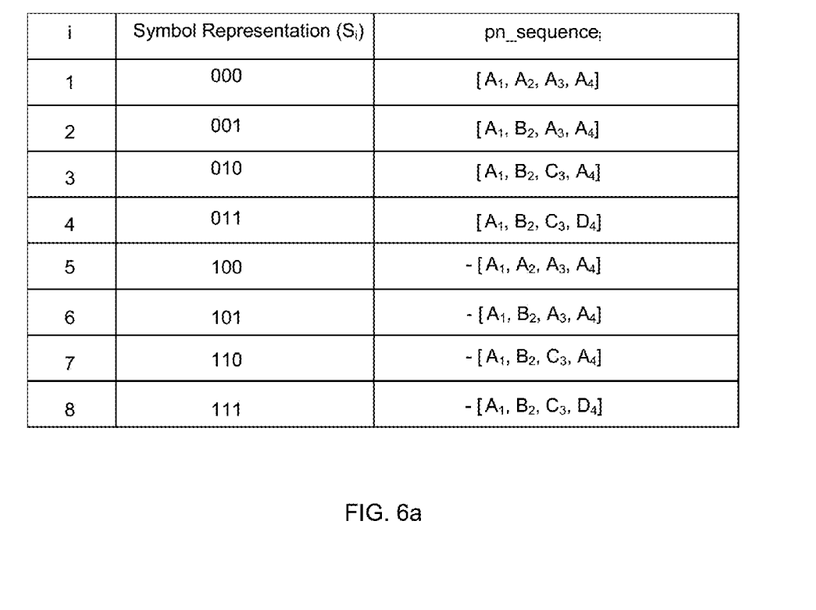
FIG. 6a illustrates a table depicting three binary bits symbol representation of a plurality of PN sequences in accordance with an exemplary embodiment of the invention.

FIG. 6a is a table illustrating three binary bits symbol representation of the plurality of PN sequences for embedding watermark 102 in the digital image in accordance with another exemplary embodiment of the invention.

As illustrated in FIG. 6a, every three binary bits in watermark 102 are mapped into a pn sequence$_i$ where i={1, 2, . . . , 8}. Thus, there are 8 pn_sequences and 8 symbols representing combinations of three binary bits.

In accordance with the symbol representation illustrated in FIG. 6a, $pn\_sequence_1 = -pn\_sequence_5$, $pn\_sequence_2 = -pn\_sequence_6$, $pn\_sequence_3 = -pn\_sequence_7$, and $pn\_sequence_4 = -pn\_sequence_8$.

Figure 6B:
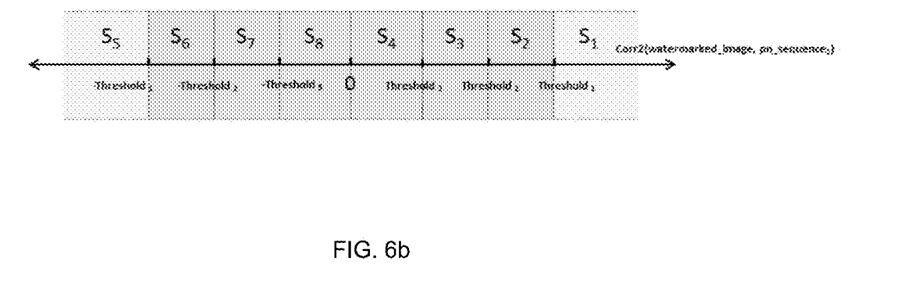
FIG. 6b depicts decision regions and thresholds in a watermark recovery process for the three binary bits symbol representation in accordance with an exemplary embodiment of the invention.

The watermark recovery process in the case of the three binary bits symbol representation is as follows.

In accordance with the exemplary embodiment of the invention, a correlation value $correlation_1$ corresponding to a correlation between the watermarked image and a $pn\_sequence_1$ is obtained. The magnitude of $correlation_1$ is then compared against a $threshold_1$. If the magnitude of $correlation_1$ is greater than the $threshold_1$, it is inferred that the watermarked image is embedded with either $pn\_sequence_1$ corresponding to symbol $S_1$ or a negative representation of $pn\_sequence_1$ that is $pn\_sequence_5$ corresponding to symbol $S_5$. Therefore, in order to determine whether $pn\_sequence_1$ or $pn\_sequence_5$ is embedded in the watermarked image, the sign of $correlation_1$ is checked. If the sign of $correlation_1$ is positive, it is determined that $pn\_sequence_1$ is embedded in the watermarked image. If the sign of $correlation_1$ is negative, it is determined that $pn\_sequence_5$ is embedded in the watermarked image. The corresponding symbols (binary bits) in watermark 102 are then recovered based on the determination.

On the other hand, if the magnitude of $correlation_1$ is less than the $threshold_1$, the magnitude of $correlation_1$ determines an initial decision region and identify potential symbols $S_i$, $S_{i+1}$, $S_{i-1}$ and their negative representations. If the magnitude of $correlation_1$ is less than $threshold_1$ and greater than $threshold_2$, $correlation_2$ is calculated between the watermarked image and $pn\_sequence_2$. The magnitude of $correlation_2$ is then compared against $threshold_1$. If the magnitude of $correlation_2$ is greater than $threshold_1$, it is inferred that the watermarked image is embedded with either $pn\_sequence_2$ corresponding to symbol $S_2$ or $pn\_sequence_6$ corresponding to symbol $S_6$. Therefore, in order to determine whether $pn\_sequence_2$ or $pn\_sequence_6$ is embedded in the watermarked image, the sign of $correlation_2$ is checked. If the sign of $correlation_2$ is positive, it is determined that $pn\_sequence_2$ is embedded in the watermarked image. If the sign of $correlation_2$ is negative, it is determined that $pn\_sequence_6$ is embedded in the watermarked image. The corresponding symbols (binary bits) in watermark 102 are then recovered based on the determination.

On the other hand, if the magnitude of $correlation_2$ is less than $threshold_1$, it is either $pn\_sequence_3$ or $pn\_sequence_7$ is embedded in the watermarked image. If the sign of $correlation_2$ is positive, it is determined that $pn\_sequence_3$ is embedded in the watermarked image. If the sign of $correlation_2$ is negative, it is determined that $pn\_sequence_7$ is embedded in the watermarked image.

On the other hand, if the magnitude of $correlation_1$ is between $threshold_2$ and $threshold_3$, $correlation_3$ is calculated between the watermarked image and $pn\_sequence_3$. The magnitude of $correlation_3$ is then compared against $threshold_1$. If the magnitude of $correlation_3$ is greater than $threshold_1$, it is inferred that the watermarked image is embedded with either $pn\_sequence_3$ corresponding to symbol $S_3$ or $pn\_sequence_7$ corresponding to symbol $S_7$. Therefore, in order to determine whether $pn\_sequence_3$ or $pn\_sequence_7$ is embedded in the watermarked image, the sign of $correlation_3$ is checked. On the other hand, if the magnitude of $correlation_3$ is less than $threshold_1$, it is that either $pn\_sequence_2/pn\_sequence_6$ or $pn\_sequence_4/pn\_sequence_8$ is embedded in the watermarked image. For the decision making, the watermark recovery process considers Euclidean distances to one of the adjacent two thresholds ($threshold_2$ and $threshold_3$). If a distance between magnitude of $correlation_1$ and $threshold_2$ is less than a distance between magnitude of $correlation_1$ and $threshold_3$, it is inferred that either $pn\_sequence_2$ or $pn\_sequence_6$ is embedded in the watermarked image. The sign is then checked for the determination. Else, if a distance between magnitude of $correlation_1$ and $threshold_2$ is greater than a distance between magnitude of $correlation_1$ and $threshold_3$, it is inferred that either $pn\_sequence_4$ or $pn\_sequence_8$ is embedded in the watermarked image and the sign is checked for the determination.

On the other hand, if the magnitude of $correlation_1$ is less than $threshold_3$ and greater than 0, $correlation_4$ is calculated between the watermarked image and $pn\_sequence_4$. The magnitude of $correlation_4$ is then compared against $threshold_1$. If the magnitude of $correlation_4$ is greater than $threshold_1$, it is inferred that the watermarked image is embedded with either $pn\_sequence_4$ corresponding to symbol $S_4$ or $pn\_sequence_8$ corresponding to symbol $S_8$. Therefore, in order to determine whether $pn\_sequence_4$ or $pn\_sequence_8$ is embedded in the watermarked image, the sign of $correlation_4$ is checked. If the magnitude of $correlation_4$ is less than $threshold_1$, the watermarked image is embedded with either $pn\_sequence_3$ or $pn\_sequence_7$ and the sign of $correlation_4$ is checked for the determination.

Figure 7A:
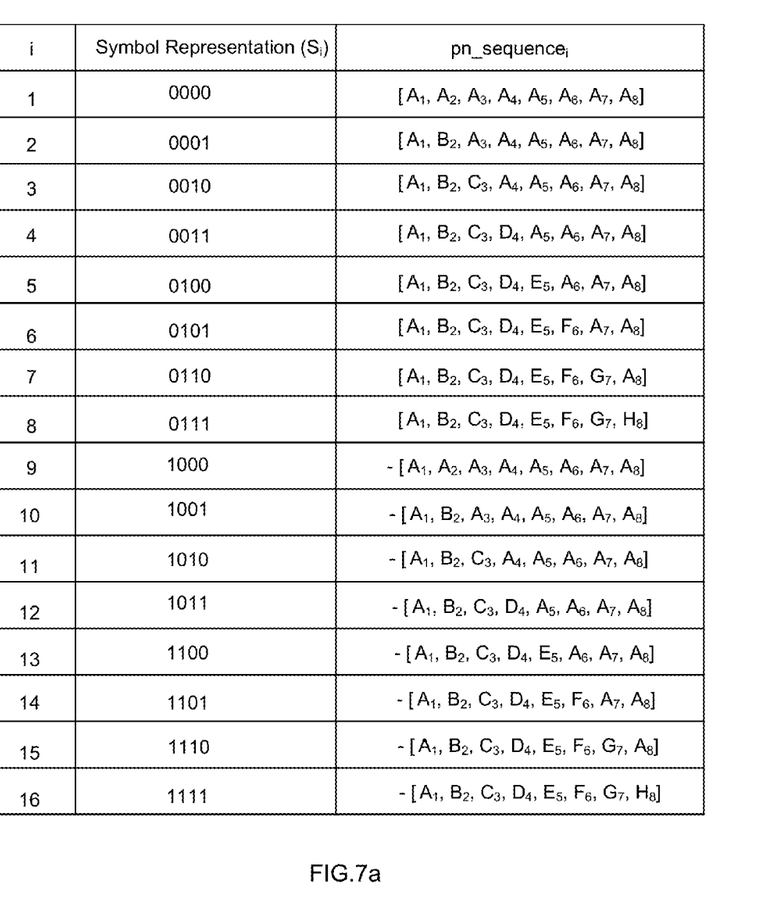
FIG. 7a illustrates a table depicting four binary bits symbol representation of a plurality of PN sequences in accordance with an exemplary embodiment of the invention.

FIG. 7a illustrates a table depicting four binary bits symbol representation of the plurality of PN sequences for embedding watermark 102 in the digital image in accordance with yet another exemplary embodiment of the invention.

As illustrated in FIG. 7a, every four binary bits in watermark 102 are mapped into a $pn\_sequence_i$, where $i=\{1,2,\ldots,16\}$. Thus, there are 16 pn_sequences and 16 symbols representing combinations of four binary bits.

In accordance with the symbol representation illustrated in FIG. 7a, $pn\_sequence_1=-pn\_sequence_9$, $pn\_sequence_2=-pn\_sequence_{10}$, $pn\_sequence_3=-pn\_sequence_{11}$, $pn\_sequence_4=-pn\_sequence_{12}$, $pn\_sequence_5=-pn\_sequence_{13}$, $pn\_sequence_6=-pn\_sequence_{14}$, $pn\_sequence_7=-pn\_sequence_{15}$, and $pn\_sequence_8=-pn\_sequence_{16}$.

Figure 7B:
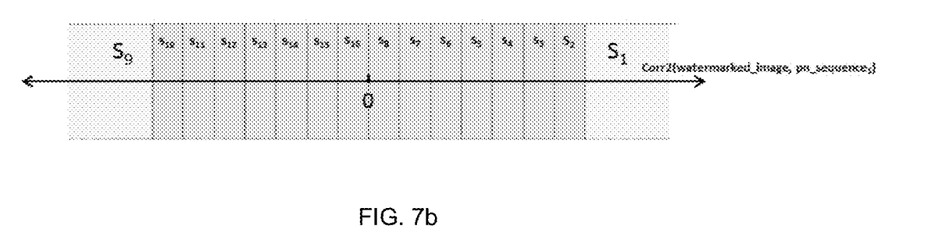
FIG. 7b depicts decision regions and thresholds in a watermark recovery process for the four binary bits symbol representation in accordance with an exemplary embodiment of the invention.

The watermark recovery process in the case of the four binary bits symbol representation is as follows.

In accordance with the exemplary embodiment of the invention, a correlation value $correlation_1$ is computed between the watermarked image and a $pn\_sequence_1$ is obtained. The magnitude of $correlation_1$ is then compared against a $threshold_1$. If the magnitude of $correlation_1$ is greater than the $threshold_1$, it is inferred that the watermarked image is embedded with either $pn\_sequence_1$ corresponding to symbol $S_1$ or a negative representation of $pn\_sequence_1$ that is $pn\_sequence_9$ corresponding to symbol $S_9$. Therefore, in order to determine whether $pn\_sequence_1$ or $pn\_sequence_9$ is embedded in the watermarked image, the sign of $correlation_1$ is checked. If the sign of $correlation_1$ is positive, it is determined that $pn\_sequence_1$ is embedded in the watermarked image. If the sign of $correlation_1$ is negative, it is determined that $pn\_sequence_9$ is embedded in the watermarked image. The corresponding symbols (binary bits) in watermark 102 are then recovered based on the determination.

On the other hand, if the magnitude of $correlation_1$ is less than the $threshold_1$, the magnitude of $correlation_1$ determines an initial decision region and identify potential symbols $S_i$, $S_{i+1}$, $S_{i-1}$ and their negative representations. If the magnitude of $correlation_1$ is less than $threshold_1$ and greater than $threshold_2$, $correlation_2$ is calculated between the watermarked image and $pn\_sequence_2$. The magnitude of $correlation_2$ is then compared against $threshold_1$. If the magnitude of $correlation_2$ is greater than $threshold_1$, it is inferred that the watermarked image is embedded with either $pn\_sequence_2$ corresponding to symbol $S_2$ or $pn\_sequence_{10}$ corresponding to symbol $S_{10}$. Therefore, in order to determine whether $pn\_sequence_2$ or $pn\_sequence_{10}$ is embedded in the watermarked image, the sign of $correlation_2$ is checked. If the sign of $correlation_2$ is positive, it is determined that $pn\_sequence_2$ is embedded in the watermarked image. If the sign of $correlation_2$ is negative, it is determined that $pn\_sequence_{10}$ is embedded in the watermarked image. The corresponding symbols (binary bits) in watermark 102 are then recovered based on the determination.

On the other hand, if the magnitude of $correlation_2$ is less than $threshold_1$, it is that either $pn\_sequence_3$ or $pn\_sequence_{11}$ is embedded in the watermarked image. The sign is checked for the determination. If the sign of $correlation_2$ is positive, it is determined that $pn\_sequence_3$ is embedded in the watermarked image. If the sign of $correlation_2$ is negative, it is determined that $pn\_sequence_{11}$ is embedded in the watermarked image.

On the other hand, if the magnitude of $correlation_1$ is between $threshold_2$ and $threshold_3$. $Correlation_3$ is calculated between the watermarked image and $pn\_sequence_3$. The magnitude of $correlation_3$ is then compared against $threshold_1$. If the magnitude of $correlation_3$ is greater than $threshold_1$, it is inferred that the watermarked image is embedded with either $pn\_sequence_3$ corresponding to symbol $S_3$ or $pn\_sequence_{11}$ corresponding to symbol $S_{11}$. Therefore, in order to determine whether $pn\_sequence_3$ or $pn\_sequence_{11}$ is embedded in the watermarked image, the sign of $correlation_3$ is checked.

On the other hand, if the magnitude of $correlation_3$ is less than $threshold_1$, it is either $pn\_sequence_2/pn\_sequence_{10}$ or $pn\_sequence_4/pn\_sequence_{12}$ is embedded in the watermarked image. For the decision making, the watermark recovery process considers Euclidean distances to one of the adjacent two thresholds ($threshold_2$ and $threshold_3$). If a distance between magnitude of $correlation_1$ and $threshold_2$ is less than a distance between magnitude of $correlation_1$ and $threshold_3$, it is inferred that either $pn\_sequence_2$ or $pn\_sequence_{10}$ is embedded in the watermarked image. The sign is then checked for the determination. Else, if a distance between magnitude of $correlation_1$ and $threshold_2$ is greater than a distance between magnitude of $correlation_1$ and $threshold_3$, it is inferred that either $pn\_sequence_4$ or $pn\_sequence_{12}$ is embedded in the watermarked image and the sign is checked for the determination.

On the other hand, if the magnitude of $correlation_1$ is less than $threshold_3$ and greater than $threshold_4$, $correlation_4$ is calculated between the watermarked image and $pn\_sequence_4$. The magnitude of $correlation_4$ is then compared against $threshold_1$. If the magnitude of $correlation_4$ is greater than $threshold_1$, it is inferred that the watermarked image is embedded with either $pn\_sequence_4$ corresponding to symbol $S_4$ or $pn\_sequence_{12}$ corresponding to symbol $S_{12}$. Therefore, in order to determine whether $pn\_sequence_4$ or $pn\_sequence_{12}$ is embedded in the watermarked image, the sign of $correlation_4$ is checked. On the other hand, if the magnitude of $correlation_4$ is less than $threshold_1$, it is either $pn\_sequence_3/pn\_sequence_{11}$ or $pn\_sequence_5/pn\_sequence_{13}$ is embedded in the watermarked image. For the decision making, the watermark recovery process considers Euclidean distances to one of the adjacent two thresholds ($threshold_3$ and $threshold_4$). If a distance between magnitude of $correlation_1$ and $threshold_3$ is less than a distance between magnitude of $correlation_1$ and $threshold_4$, it is inferred that either $pn\_sequence_3$ or $pn\_sequence_{11}$ is embedded in the watermarked image. The sign is then checked for the determination. Else, if a distance between magnitude of $correlation_1$ and $threshold_3$ is greater than a distance between magnitude of $correlation_1$ and $threshold_4$, it is inferred that either $pn\_sequence_5$ or $pn\_sequence_{13}$ is embedded in the watermarked image and the sign is checked for the determination.

On the other hand, if the magnitude of $correlation_1$ is between $threshold_4$ and $threshold_5$, $correlation_5$ is calculated between the watermarked image and $pn\_sequence_5$. The magnitude of $correlation_5$ is then compared against $threshold_1$. If the magnitude of $correlation_5$ is greater than $threshold_1$, it is inferred that the watermarked image is embedded with either $pn\_sequence_5$ corresponding to symbol $S_5$ or $pn\_sequence_{13}$ corresponding to symbol $S_{13}$. Therefore, in order to determine whether $pn\_sequence_5$ or $pn\_sequence_{is}$ embedded in the watermarked image, the sign of $correlation_5$ is checked.

On the other hand, if the magnitude of $correlation_5$ is less than $threshold_1$, it is either $pn\_sequence_4/pn\_sequence_{12}$ or $pn\_sequence_6/pn\_sequence_{14}$ is embedded in the watermarked image. For the decision making, the watermark recovery process considers Euclidean distances to one of the adjacent two thresholds ($threshold_4$ and $threshold_5$). If a distance between magnitude of $correlation_1$ and $threshold_4$ is less than a distance between magnitude of $correlation_1$ and threshold$_5$, it is inferred that either pn_sequence$_4$ or pn_sequence$_{12}$ is embedded in the watermarked image. The sign is then checked for the determination. Else, if a distance between magnitude of correlation$_1$ and threshold$_4$ is greater than a distance between magnitude of correlation$_1$ and threshold$_5$, it is inferred that either pn_sequence$_6$ or pn_sequence$_{14}$ is embedded in the watermarked image and the sign is checked for the determination.

Moving on, if the magnitude of correlation$_1$ is between threshold$_5$ and threshold$_6$, correlation$_6$ is calculated between the watermarked image and pn_sequence$_6$. The magnitude of correlation$_6$ is then compared against threshold$_1$. If the magnitude of correlation$_6$ is greater than threshold$_1$, it is inferred that the watermarked image is embedded with either pn_sequence$_6$ corresponding to symbol S$_6$ or pn_sequence$_{14}$ corresponding to symbol S$_{14}$. Therefore, in order to determine whether pn_sequence$_6$ or pn_sequence$_{14}$ is embedded in the watermarked image, the sign of correlation$_6$ is checked. On the other hand, if the magnitude of correlation$_6$ is less than threshold$_1$, it is either pn_sequence$_5$/pn_sequence$_7$ or pn_sequence$_7$/pn_sequence$_{15}$ is embedded in the watermarked image. For the decision making, the watermark recovery process considers Euclidean distances to one of the adjacent two thresholds (threshold$_5$ and threshold$_6$). If a distance between magnitude of correlation$_1$ and threshold$_5$ is less than a distance between magnitude of correlation$_1$ and threshold$_6$, it is inferred that either pn_sequence$_5$ or pn_sequence$_n$ is embedded in the watermarked image. The sign is then checked for the determination. Else, if a distance between magnitude of correlation$_1$ and threshold$_5$ is greater than a distance between magnitude of correlation$_1$ and threshold$_6$, it is inferred that either pn_sequence$_7$ or pn_sequence$_{15}$ is embedded in the watermarked image and the sign is checked for the determination.

On the other hand, if the magnitude of correlation$_1$ is between threshold$_6$ and threshold$_7$, correlation$_7$ is calculated between the watermarked image and pn_sequence$_7$. The magnitude of correlation$_7$ is then compared against threshold$_1$. If the magnitude of correlation$_7$ is greater than threshold$_1$, it is inferred that the watermarked image is embedded with either pn_sequence$_7$ corresponding to symbol S$_7$ or pn_sequence$_{15}$ corresponding to symbol S$_{15}$. Therefore, in order to determine whether pn_sequence$_7$ or pn_sequence$_{15}$ is embedded in the watermarked image, the sign of correlation$_7$ is checked.

On the other hand, if the magnitude of correlation$_7$ is less than threshold$_1$, it is either pn_sequence$_6$/pn_sequence$_{14}$ or pn_sequence$_8$/pn_sequence$_{16}$ is embedded in the watermarked image. For the decision making, the watermark recovery process considers Euclidean distances to one of the adjacent two thresholds (threshold$_6$ and threshold$_7$). If a distance between magnitude of correlation$_1$ and threshold$_6$ is less than a distance between magnitude of correlation$_1$ and threshold$_7$, it is inferred that either pn_sequence$_6$ or pn_sequence$_{14}$ is embedded in the watermarked image. The sign is then checked for the determination. Else, if a distance between magnitude of correlation$_1$ and threshold$_6$ is greater than a distance between magnitude of correlation$_1$ and threshold$_7$, it is inferred that either pn_sequence$_8$ or pn_sequence$_{16}$ is embedded in the watermarked image and the sign is checked for the determination.

Finally, if the magnitude of correlation$_1$ is less than threshold$_7$ and greater than 0, correlation$_8$ is calculated between the watermarked image and pn_sequence$_8$. The magnitude of correlation$_8$ is then compared against threshold$_1$. If the magnitude of correlation$_8$ is greater than threshold$_1$, it is inferred that the watermarked image is embedded with either pn_sequence$_8$ corresponding to symbol S$_8$ or pn_sequence$_{16}$ corresponding to symbol S$_{16}$. Therefore, in order to determine whether pn_sequence$_8$ or pn_sequence$_{16}$ is embedded in the watermarked image, the sign of correlation$_8$ is checked. If the magnitude of correlation$_8$ is less than threshold$_1$, the watermarked image is embedded with either pn_sequence$_7$ or pn_sequence$_{15}$ and the sign of correlation$_8$ is checked for the determination.

Various advantages provided by the invention are outlined below.

The invention uses an effective technique of symbol representation of the PN sequences that reduces the number of embedding operations required during digital image watermarking. Less number of PN sequences are embedded in the digital image to create the watermarked image. Thus, reducing the number of embedded PN sequences enhance the quality of the watermarked image.

Further the symbol representation reduces the number of correlation operations involved during the watermark recovery process. This reduces amount of processing power and the energy consumption needed to perform these computationally intensive operations.

Also, the invention uses grey coding for the symbol representation in order to reduce the number of binary bits in error during the recovery of the watermark.

The invention also offers significant reduction in storage space as every user has a unique identification such as a password which can be used to provide a seed by applying a hash function to generate a PN sequences. Thus, all PN sequences used to generate the watermarked image are not required to be saved at the device.

Moving on, the invention segments the digital image into a plurality of image blocks prior to embedding the watermark and adds a PN sequence to each image block instead of the entire digital image. Firstly, this technique prevents adding too much noise to the same pixel in the image. The selection of size of an image block has to be designed carefully to maintain good correlation$_i$ while at the same time preventing noise from getting accumulated and causing big distortion to the digital image. Secondly, this technique reduces the number of mathematical operations used in the watermark recovery process to recover the watermark. This is because the size of the block is smaller than the size of the entire image, and consequently less computation resources are needed in the recovery process.

Further, the invention employs an adaptive design for selecting the image block size to allow a trade-off for performance (resolution) of the recovered watermark, and the quality of the watermarked image. A large block size is better for resolution of recovered watermark but worse for both quality of watermarked image and computational resources and vice versa.

The invention also uses the original digital image during the watermark recovery process by subtracting the original digital image from the watermarked image prior to computing the correlation value. This technique results in guaranteed high correlation value, thus improving the quality of recovery and reducing errors in the recovered watermark.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for embedding a watermark in a digital image, wherein the watermark comprises a plurality of binary bits, the method comprising:
    representing the plurality of binary bits in the watermark using a plurality of symbols, wherein each symbol of the plurality of symbols represents at least two binary bits;
    transforming the plurality of symbols into a plurality of pseudo noise (PN) sequences, wherein a symbol transformed into a PN sequence represents at least one PN sequence vector from a set of PN sequence vectors;
    embedding the plurality of PN sequences corresponding to the plurality of symbols in the digital image to generate a watermarked image;
    recovering the watermark from the watermarked image including:
        identifying the plurality of PN sequences in the watermarked image to recover the corresponding plurality of symbols associated with the watermark;
        obtaining a correlation value corresponding to a correlation between the watermarked image and a PN sequence, wherein the correlation value comprises a magnitude and a sign;
        comparing the magnitude of the correlation value with thresholds, wherein the thresholds are selected based on a size of the PN sequence, while the number of thresholds is selected based on a number of binary bits represented by a symbol; and
        identifying the PN sequence in the watermarked image based on decision regions and the sign of the correlation value.

2. The method of claim 1, wherein each symbol represents a combination of bits such that adjacent symbols differ in only one bit using grey coding.

3. The method of claim 1, wherein the transforming comprises generating a PN sequence using a password associated with every user.

4. The method of claim 1, wherein the representing comprises a PN sequence sharing at least one PN sequence vector with at least one of another PN sequence.

5. The method of claim 1, wherein the embedding comprises:
    dividing the digital image into a plurality of image blocks; and
    adding at least one PN sequence to each image block of the digital image.

6. The method of claim 1, wherein the comparing comprises eliminating PN sequences that have a correlation magnitude less than a threshold using an iterative process.

7. The method of claim 1 further comprises subtracting the digital image from the watermarked image prior to obtaining the correlation value.

8. A system for embedding a watermark in a digital image, wherein the watermark comprises a plurality of binary bits, the system comprising:
    a memory;
    a processor in communication with the memory;
    a watermark embedding module communicatively coupled to the memory and the processor, wherein the watermark embedding module is configured to:
        represent the plurality of binary bits using a plurality of symbols, wherein each symbol represents at least two binary bits;
        transform the plurality of symbols into a plurality of pseudo noise (PN) sequences, wherein a symbol transformed into a PN sequence represents at least one PN sequence vector from a set of PN sequence vectors; and
        embed the plurality of PN sequences corresponding to the plurality of symbols in the digital image to generate a watermarked image;
    a watermark recovery module, wherein the watermark recovery module is configured to:
        identify the plurality of PN sequences in the watermarked image to recover the corresponding plurality of symbols associated with the watermark;
        obtain a correlation value corresponding to a correlation between the watermarked image and a PN sequence, wherein the correlation value comprises a magnitude and a sign;
        compare the magnitude of the correlation value with thresholds, wherein the thresholds are selected based on a size of the PN sequence, while the number of thresholds is selected based on a number of binary bits represented by a symbol; and
        identify the PN sequence in the watermarked image based on decision regions and the sign of the correlation value.

9. The system of claim 8, wherein the watermark embedding module is configured to:
    divide the digital image into a plurality of image blocks; and
    add at least one PN sequence to each image block of the digital image.

10. The system of claim 8, wherein the comparing comprises eliminating PN sequences that have a correlation magnitude less than a threshold using an iterative process.

11. The system of claim 8, wherein the watermark recovery module is further configured to subtract the digital image from the watermarked image prior to obtaining the correlation value.

* * * * *